United States Patent [19]

Mori et al.

[11] Patent Number: 5,623,272
[45] Date of Patent: Apr. 22, 1997

[54] ELECTRONIC APPARATUS WITH CIRCUITRY FOR ADJUSTING RELATIONAL EXPRESSIONS REPRESENTING RELATION OF DISPLAY ADJUSTMENT DATA TO OTHER CLOSELY RELATED DISPLAY ADJUSTMENT DATA

[75] Inventors: Yasunori Mori, Kanagawa; Yuki Inoue, Tokyo; Yoshihisa Narui, Saitama, all of Japan

[73] Assignee: Sony Corporation, Tokyo, Japan

[21] Appl. No.: 407,289

[22] Filed: Mar. 20, 1995

[30] Foreign Application Priority Data

Mar. 22, 1994 [JP] Japan ................................ 6-049639

[51] Int. Cl.$^6$ ................................................. G09G 1/08
[52] U.S. Cl. .............................. 345/13; 345/14; 348/806
[58] Field of Search ................. 345/13, 14, 15, 345/12; 348/806, 807, 745, 746, 747; 315/364, 367, 370, 371; H04N 3/22, 3/23, 3/26

[56] References Cited

U.S. PATENT DOCUMENTS

| | | | |
|---|---|---|---|
| 4,706,115 | 11/1987 | Colineau et al. | 348/746 |
| 4,870,329 | 9/1989 | Ara | 315/367 |
| 5,034,664 | 7/1991 | Fernsler et al. | 315/370 |
| 5,173,644 | 12/1992 | Aoki et al. | |
| 5,258,840 | 11/1993 | Miyazaki et al. | |
| 5,301,025 | 4/1994 | Hatano et al. | 348/806 |

FOREIGN PATENT DOCUMENTS 0096872  5/1986  Japan.

*Primary Examiner*—Chanh Nguyen
*Attorney, Agent, or Firm*—Jay H. Maioli

[57] ABSTRACT

An image signal display device includes program data readout circuitry by which at least one second adjustment data not to be adjusted takes a proper value relative to a first adjustment data to be adjusted, in accordance with a predetermined relational expression. Data calculating circuitry is provided to calculate the second adjustment data in accordance with the predetermined relational expression, in response to a change in the first adjustment data. Data changing circuitry is provided to change the second adjustment data together with the first adjustment data. A memory is provided to store at least a coefficient data of the relational expression, wherein the memory can be read out from and written to. A digital/analog conversion circuit is provided to convert an output signal from the memory into an analog signal. Additionally, a display is provided to represent an output signal from the digital/analog conversion circuit as an image.

2 Claims, 5 Drawing Sheets

ELECTRONIC APPARATUS WITH CIRCUITRY FOR ADJUSTING RELATIONAL EXPRESSIONS REPRESENTING RELATION OF DISPLAY ADJUSTMENT DATA TO OTHER CLOSELY RELATED DISPLAY ADJUSTMENT DATA

BACKGROUND OF THE INVENTION

1. Field of the Invention

This invention relates to an electronic apparatus and an image display device in which at least two of many adjustment items are in close relation to each other.

2. Description of the Related Art

For suitably accomplishing a deflection adjustment of an image on a picture tube of for example, the picture tube of a television receiver, an electronic apparatus or an image signal display device, there are adjustment items these as horizontal and vertical deflection centers, and horizontal and vertical linearity distortions. It is to be noted that some of such adjustment items are in such close relation to each other so as to be affected by each other. For example, when vertical deflection size is changed, pin distortion and/or vertical linearity distortion occurs. Accordingly, adjustment for these distortions is necessary after changing the vertical deflection size.

In view of the above, the following technique has been developed as disclosed in Japanese Patent Provisional Publication No. 61-96872, upon paying attention to the fact that adjustment data (not to be adjusted) are in such a relation to another adjustment data (to be adjusted) as to obtain a suitable value relative to the latter adjustment data, under the effect of a predetermined relational expression or formula. This relational expression is stored in a ROM, and the adjustment data (not to be adjusted) are calculated using the above relational expression when the adjustment data (to be adjusted) are changed. Thus, the adjustment data (not to be adjusted) are also changed along with the adjustment data (to be adjusted). According to this technique, changing only the adjustment data (to be adjusted) is sufficient to obtain a suitable image on the picture tube thereby making adjustments that may accompany the changing of the adjustment data (to be adjusted) unnecessary. Related techniques to the above are disclosed in U.S. Pat. Nos. 5,258,840 and 5,173,644.

However, drawbacks have been encountered in the above conventional technique. Because the above-mentioned relational expression is stored in a ROM, it is necessary to reproduce the ROM whenever replacement of parts, modification of a circuit, and/or addition of a new function is required. If no reproduction of the ROM is made, an optimum adjustment of the image on the picture tube cannot be achieved.

SUMMARY OF THE INVENTION

It is an object of the present invention to provide an improved electronic apparatus and image signal display device in which adjustment of a displayed image can be optimized using a relational expression without requiring reproduction of a memory even if replacement of parts or the like is made.

An aspect of the present invention resides in an electronic apparatus which comprises program data read-out means by which at least one second adjustment data not to be adjusted takes a proper value relative to a first adjustment data to be adjusted, in accordance with a predetermined relational expression. Data calculating means is provided to calculate the second adjustment data in accordance with the predetermined relational expression, in response to a change in the first adjustment data. Data changing means is provided to change the second data together with the first data. Memory means is provided to store at least coefficient data of the relational expression, wherein the means memory can be read from and written to.

Another aspect of the present invention resides in an image signal display device which comprises program data read-out means by which at least one second adjustment data not to be adjusted takes a proper value relative to a first adjustment data to be adjusted, in accordance with a predetermined relational expression. Data calculating means is provided to calculate the second adjustment data in accordance with the predetermined relational expression, in response to a change in the first adjustment data. Data changing means is provided to change the second data together with the first data. Memory, means is provided to store at least coefficient data of the relational expression, wherein the means memory can be read out and written. A digital/analog conversion circuit is provided to convert an output signal from the memory means into an analog signal. Additionally, a display is provided to represent an output-signal from the digital/analog conversion circuit as an image.

Thus, by virtue of the fact that at least the coefficient data of the relational expression is stored in the memory means which can be read out and written, an optimum adjustment of a displayed image can be achieved without requiring reproduction of the memory even if replacement of parts or the like is carried out, in case that the adjustment data not to be adjusted is in such a relation to the adjustment data to be adjusted as to obtain a suitable value relative to the latter adjustment data.

DETAILED DESCRIPTION OF PREFERRED EMBODIMENTS

Referring now to FIGS. 1 to 5, an embodiment of the electronic apparatus according to the present invention is illustrated, in which the principle of the present invention is applied to an image signal display device including a display 7 such as a cathode ray tube. The image signal display device has a circuit arrangement as shown in the block diagram of FIG. 1A.

Figure 1A:
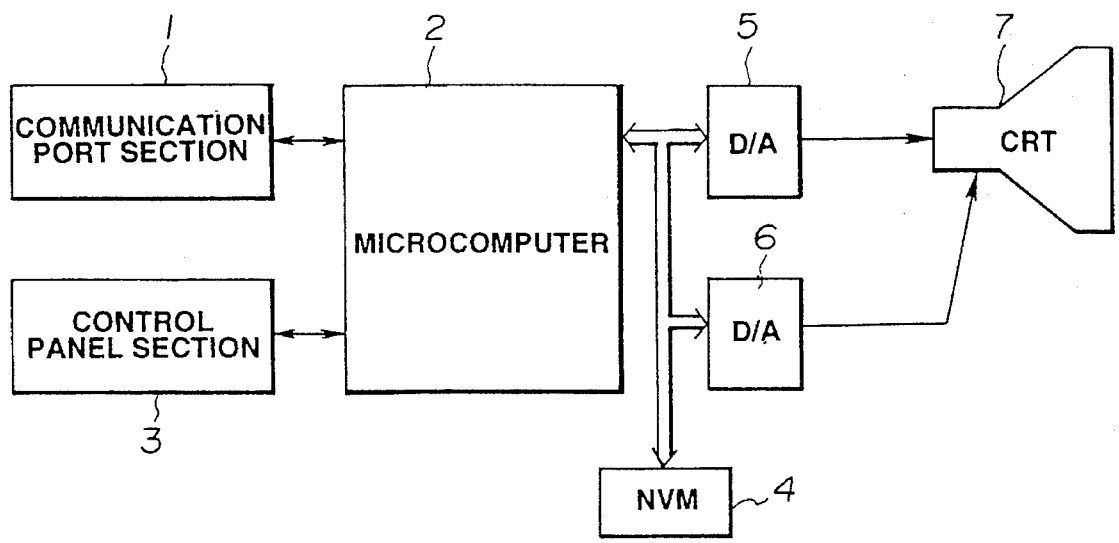
FIG. 1A is a block diagram of an embodiment of an essential part of a circuit of an image signal display device according to the present invention.

As shown in FIG. 1A, the image signal display device comprises a microcomputer 2 connected to a communication port section 1 which is connected to an external apparatus (not shown), wherein data are received and transmitted between the external apparatus and the microcomputer 2 through the communication port section 1. A control panel section 3 is connected to the microcomputer 2 and provided with a variety of operating keys (not shown), in which data are input to the microcomputer 2 under a key input. In other words, selection of a variety of modes, input of adjustment data, input of correction data and the like are made by the external apparatus and/or the control panel section 3.

The microcomputer 2 is for a system control and arranged to be able to make data communication a non-volatile memory 4, respective D/A converters 5, 6 and the like. The microcomputer 2 is arranged to execute the program of the flowchart of FIG. 2, the contents of which will be discussed later.

Figure 1B:
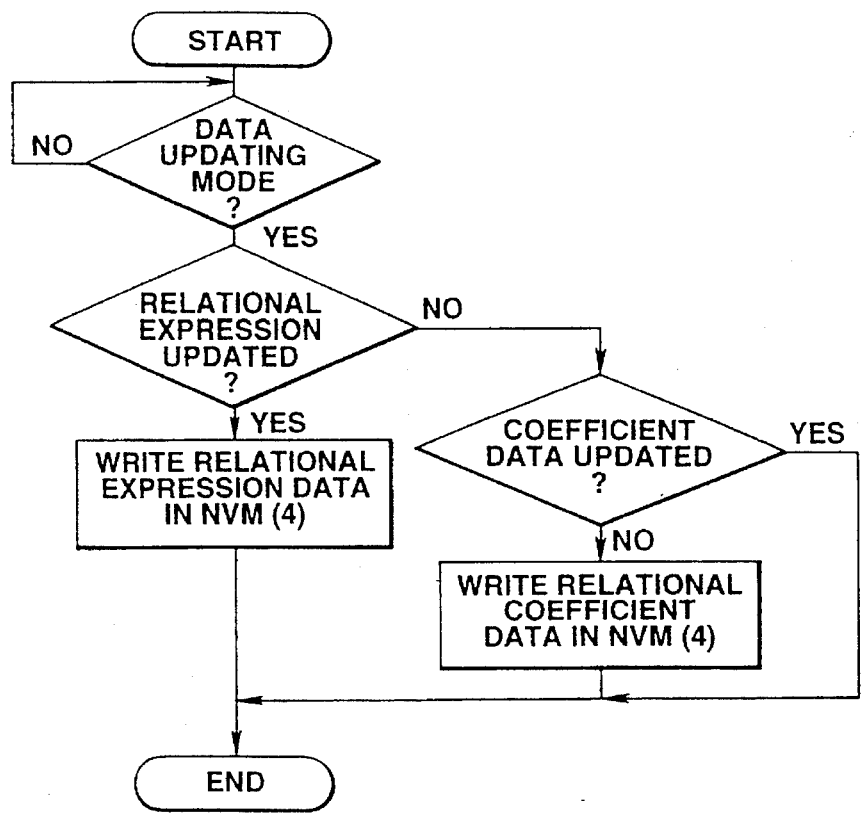
FIG. 1B is a flowchart of a program for a data updating mode in the image signal display device of FIG. 1A.
Figure 2:
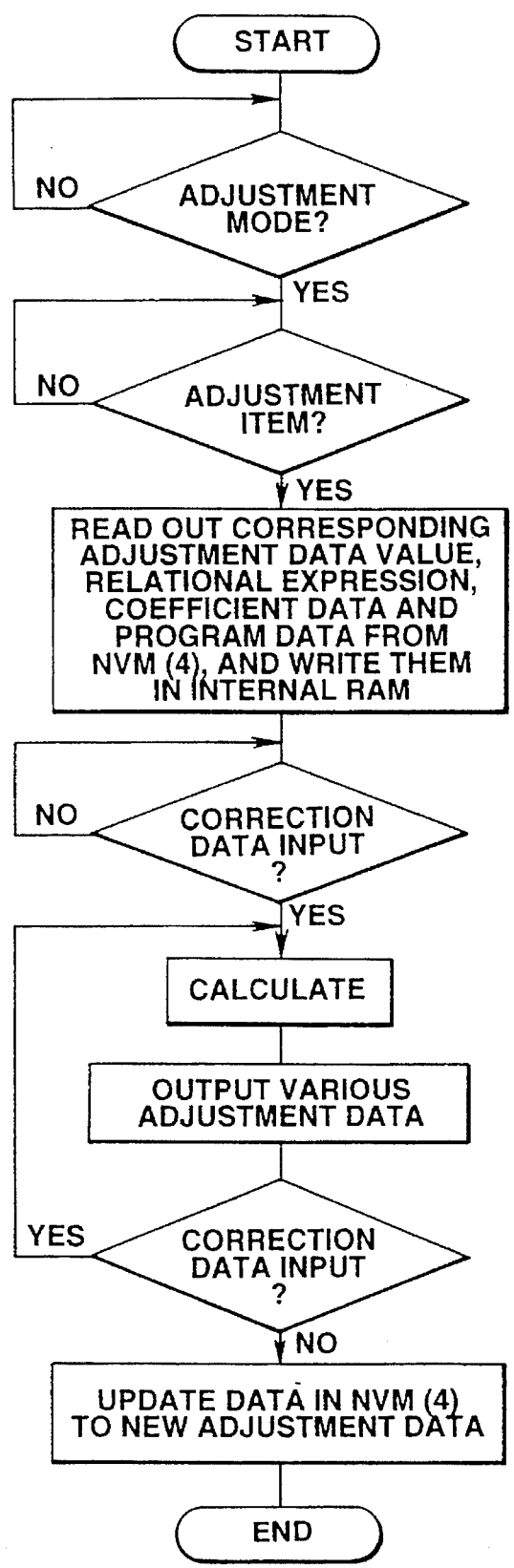
FIG. 2 is a flowchart of a program for adjusting a displayed image in the image signal display device.

The non-volatile memory 4 is arranged as a memory which can be read out and written, and stores data for the programs of FIGS. 1B and 2 also and a variety of numerical data. The numerical data include factory data used for adjustment of an image displayed on the display 7, such as an initial vertical deflection center data value, an initial horizontal deflection center data value, an initial vertical deflection size data value, an initial horizontal deflection size data value, an initial vertical linearity distortion data value and an initial horizontal linearity distortion data value; user data corresponding to the above-mentioned data values; and relational expressions or formulae data and data for coefficients $K_1$ to $K_7$ shown in FIGS. 3, 4 and 5. In other words, the relational data and the data for coefficients $K_1$ to $K_7$ are reloadable or changeable.

Each D/A converter 5 is adapted to convert the adjustment data output from the microcomputer 2 to analog signals and output them to a peripheral circuit such as the display 7.

Next, a manner of operating of the above electronic apparatus will be discussed hereinafter.

Figure 3:
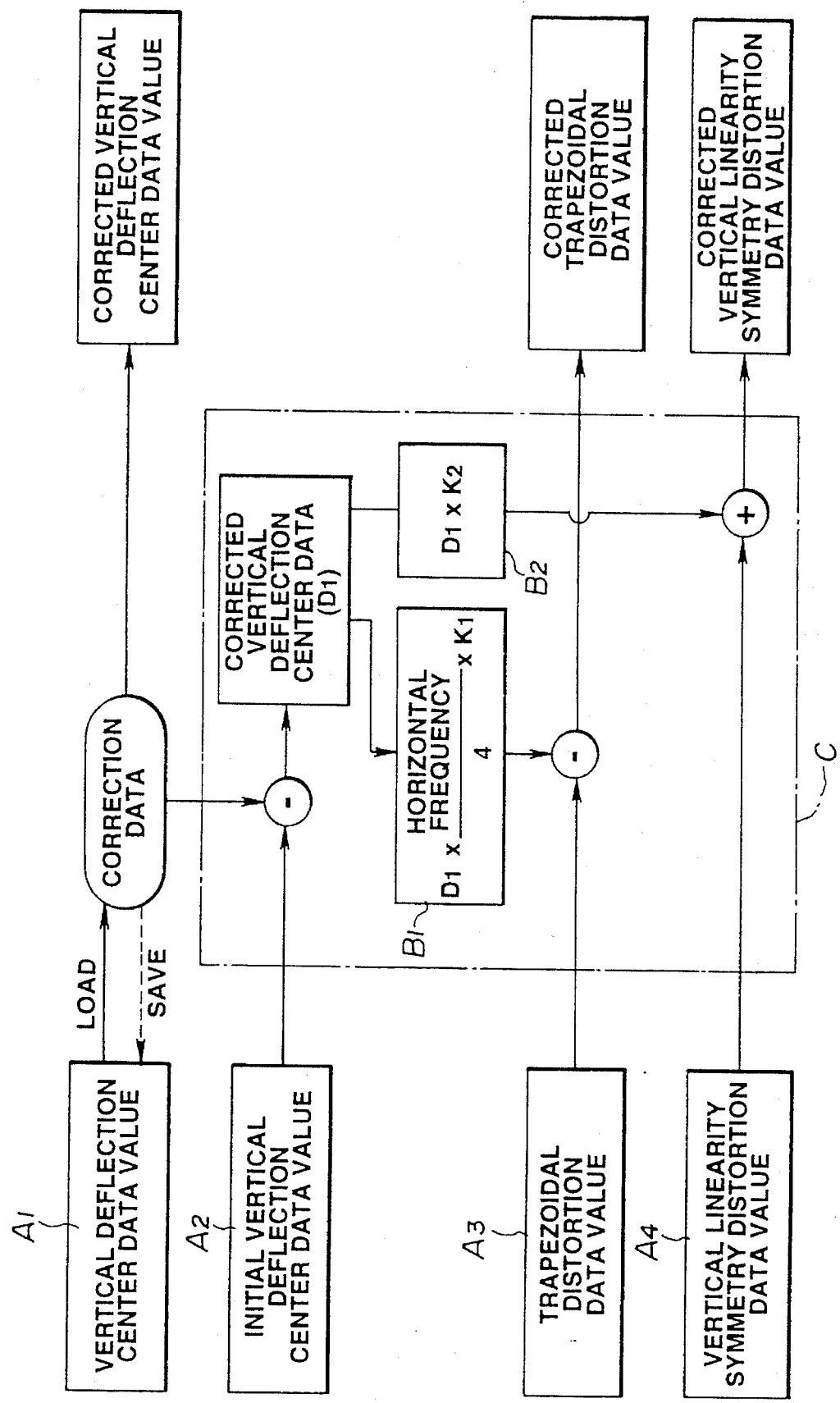
FIG. 3 is a block diagram showing a manner of arithmetic Control for adjusting a vertical deflection center.

For correcting the adjustment data by a user, an adjustment item (for example, the vertical deflection center) to be corrected is selected after selection of an adjustment mode. Then, the microcomputer 2 reads out corresponding adjustment data values ($A_1$ to $A_4$ in FIG. 3), relational expressions ($B_1$ and $B_2$ in FIG. 3), coefficient data values $K_1$, $K_2$, and program data (a procedure indicated by C in FIG. 3), and writes them in an internal RAM. When correction data for the vertical deflection center is input, the operation shown in FIG. 3 is executed thereby outputting a corrected vertical deflection center data value to the D/A converter 6 while outputting a corrected trapezoidal distortion data value and a corrected vertical linearity symmetry distortion data value, which have been corrected in accordance with the new vertical deflection center corrected according to the correction data, to the D/A converter 6. In other words, when the center of the vertical deflection is moved, the trapezoidal distortion and the vertical linearity symmetry distortion are corrected respectively by the relational expressions $B_1$, $B_2$ simultaneously with the movement of the vertical deflection center thereby displaying a good image having no distortion on the display 7. When the corrections have been completed, the data in the non-volatile memory 2 are updated to new adjustment data.

Figure 4:
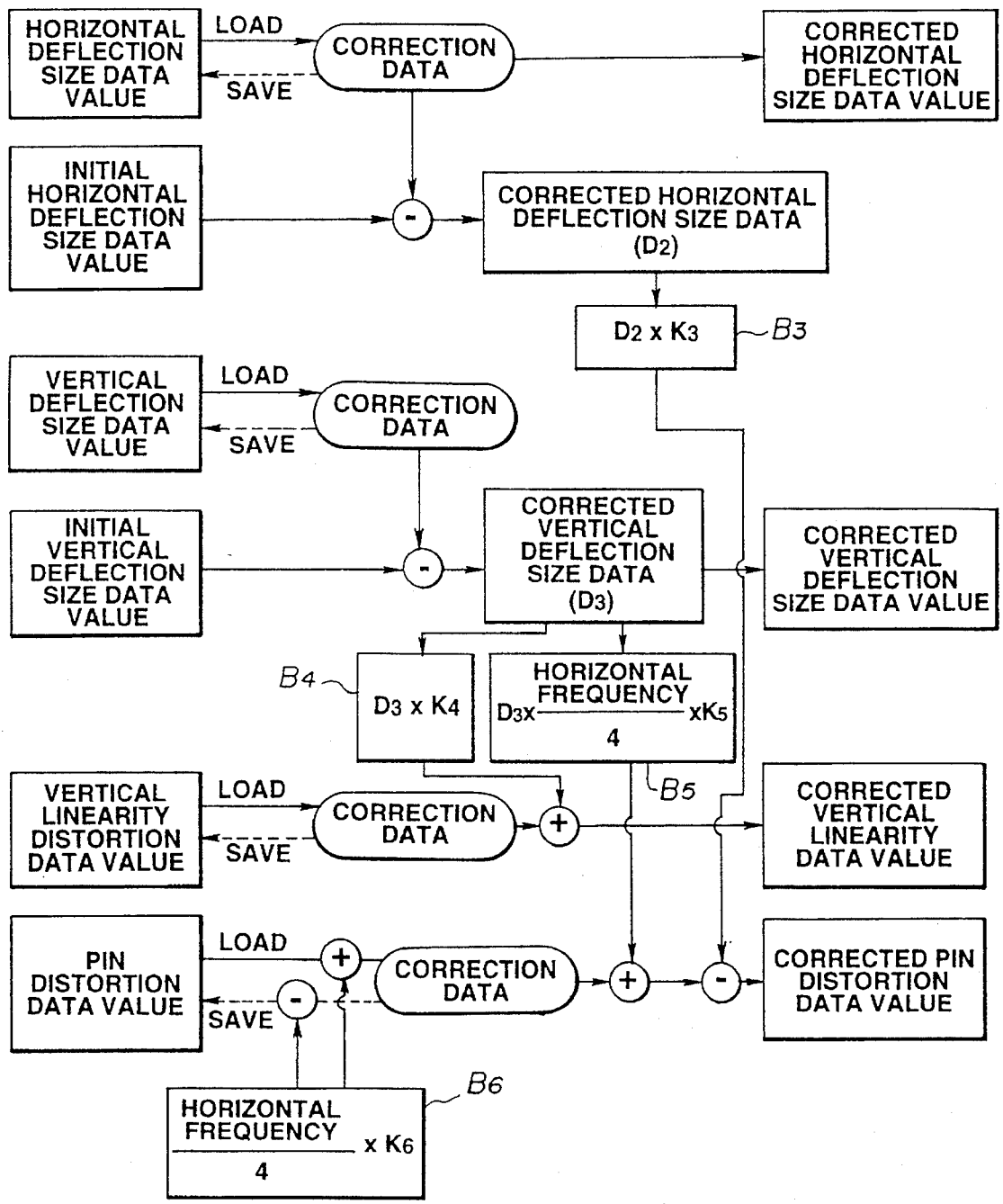
FIG. 4 is a block diagram showing another manner of arithmetic control for adjusting vertical and horizontal deflection sizes.
Figure 5:
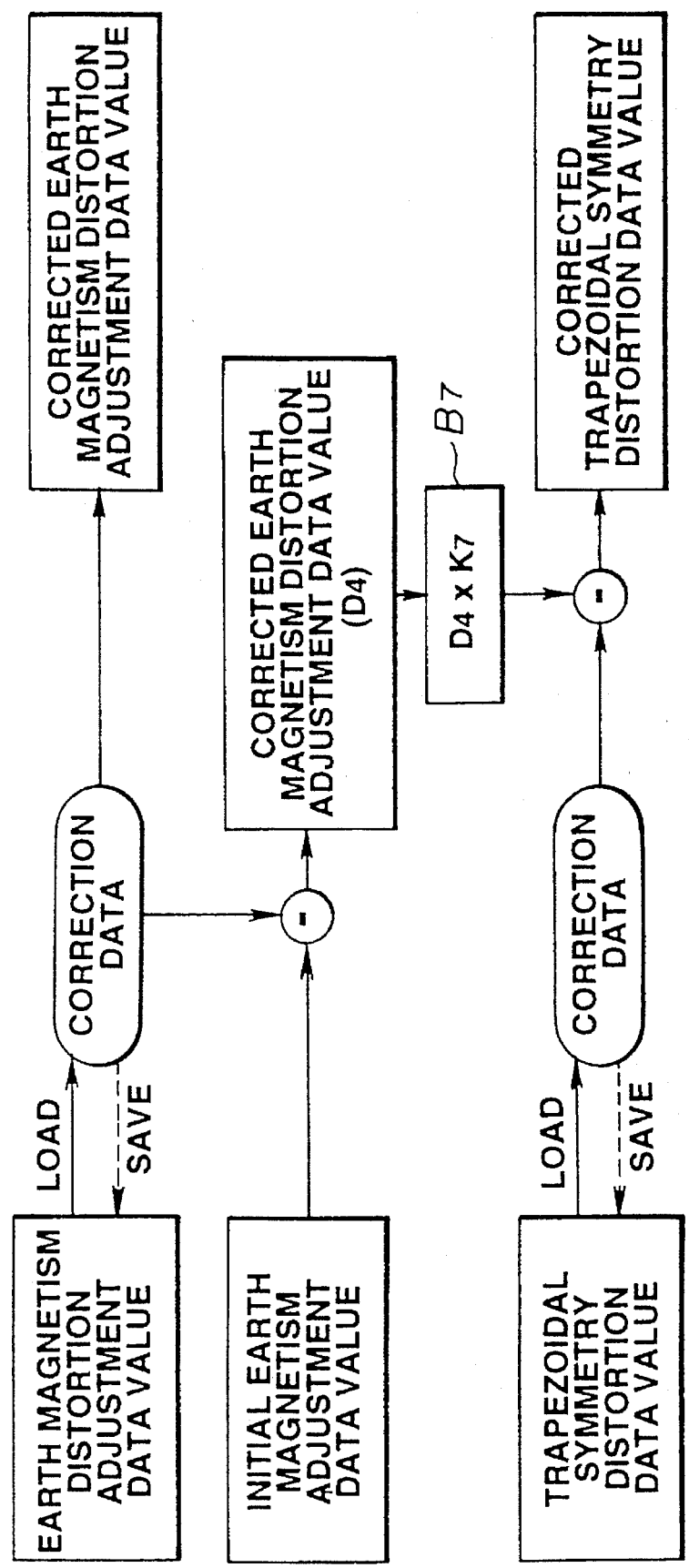
FIG. 5 is a block diagram showing a manner of arithmetic control for adjusting for earth's magnetism.

In case of adjusting the horizontal and vertical sizes of the image on the display 7, the operation shown in FIG. 4 is executed in which the relational expressions $B_3$ to $B_6$ and the coefficient data $K_3$ to $K_6$ are used. In case of adjusting for distortion due to earth's magnetism, the operation shown in FIG. 5 is executed in which the relational expression $B_7$ and the coefficient data $K_7$ are used.

In case that the coefficient data $K_1$ to $K_7$ and/or the relational expressions $B_1$ to $B_7$ become unsuitable due to an addition of functions, change of circuits and/or change of parts after the various adjustment data are set, the data updating mode in FIG. 1B is selected wherein coefficient data $K'_1$ to $K'_7$ and/or relational expressions $B'_1$ to $B'_7$ are input. As a result, the content of the non-volatile memory 4 is updated in accordance with the input data and the relational expressions. Accordingly, an appropriate correction is made of the image on the display device 7 without reproduction of the memory.

While the principle of the present invention has been shown and described as being applied to an image signal display device in the above embodiment, it will be understood that it may be applied to other electronic apparatuses or image signal display devices in which at least two of many adjustment items are in close relation to each other. Additionally, although the relational expressions and the coefficient data have been shown and described as being selectively changeable in the above embodiment, it will be appreciated that only coefficient data or whole relational expressions may be changed.

What is claimed is:

1. An image signal display device comprising:

program data read-out means by which at least one second adjustment data not to be adjusted takes a predetermined value relative to a first adjustment data to be adjusted, in accordance with a predetermined relational expression;

data calculating means for calculating said second adjustment data in accordance with said predetermined relational expression, in response to a change in said first adjustment data;

data changing means for changing said second adjustment data together with said first adjustment data;

memory means for storing Whole relational expressions, wherein said memory means can be read out from and written to;

digital/analog conversion means for converting an output signal from said memory means into an analog signal; and a display for representing an output signal from said digital/analog conversion means as an image, said display having a deflecting circuit, wherein each of said adjustment data is correction data of linearity and trapezoidal distortions for application to said deflection circuit of said display, wherein said correction data includes a vertical deflection center correction data, a trapezoidal deflection correction data, and a vertical linearity symmetry distortion correction data, and wherein said image signal display device further comprises a first arithmetic circuit to which said vertical deflection center data and a predetermined correction data are input, and a second arithmetic circuit to which a result from a calculation output from said first arithmetic circuit and said trapezoidal deflection data are input to output a corrected trapezoidal deflection data value, thereby producing a corrected vertical linearity symmetry distortion value in accordance with said result from the calculation output from said first arithmetic circuit and said vertical linearity symmetry distortion value.

2. An image signal display device as claimed in claim 1, wherein said first arithmetic circuit includes a first coefficient circuit for said vertical defection data, and a second coefficient circuit for said vertical linearity symmetry data.

* * * * *

UNITED STATES PATENT AND TRADEMARK OFFICE
CERTIFICATE OF CORRECTION

PATENT NO. : 5,623,272
DATED : April 22, 1997
INVENTOR(S) : Yasunori Mori, Yuki Inoue, and Yoshihisa Narui It is certified that error appears in the above-identified patent and that said Letters Patent is hereby corrected as shown below:

In the Abstract, line 11, delete "a"
Col.1, lines 16 & 17, delete "for example, the picture tube of a television receiver,"
    line 18, after "device," insert --for example, the picture tube of a television receiver,--
    line 21, change "such" first occurrence, to --these--
    line 36, delete "above"
Col.2, line 8, change "means memory" to --memory means--
    line 9, after "read" insert --out--
    line 20, after "Memory" delete ","
    line 22, change "means memory" to --memory means--
    line 25, after "output" delete "-"
    line 49, change "Control" to --control--
Col.3, line 14, after "communication" insert --between--
    line 21, change "also and" to --and also--
    line 32, after "relational" insert --expressions--
    line 37, delete "of" second occurrence <u>In the claims</u>:
Col.4, line 43, change "Whole" to --whole--

Signed and Sealed this

Fifteenth Day of September, 1998

*Attest:*

BRUCE LEHMAN

*Attesting Officer*     *Commissioner of Patents and Trademarks*